United States Patent [19]

Noguchi

[11] Patent Number: 4,775,445

[45] **Date of Patent: * Oct. 4, 1988**

[54] PROCESS FOR PRODUCING A LIQUID JET RECORDING HEAD

[75] Inventor: Hiromichi Noguchi, Urawa, Japan

[73] Assignee: Canon Kabushiki Kaisha, Tokyo, Japan

[ * ] Notice: The portion of the term of this patent subsequent to Apr. 14, 2004 has been disclaimed.

[21] Appl. No.: 1,174

[22] Filed: Jan. 7, 1987

Related U.S. Application Data

[63] Continuation of Ser. No. 811,460, Dec. 20, 1985, Pat. No. 4,657,631.

[30] Foreign Application Priority Data

Dec. 28, 1984 [JP] Japan ................................ 59-274689

[51] Int. Cl.$^4$ ........................ B44C 1/22; B29C 37/00; C03C 15/00

[52] U.S. Cl. ................................ 156/637; 156/272.2; 156/629; 156/630; 156/633; 156/651; 156/655; 156/668

[58] Field of Search ..................... 156/272.2, 629, 630, 156/633, 645, 655, 668, 639, 643, 651, 652, 656; 346/1.1, 140 R, 140 A; 252/79.1, 79.5

[56] References Cited

U.S. PATENT DOCUMENTS 4,657,631 4/1987 Noguchi ............................ 156/655

*Primary Examiner*—William A. Powell

*Attorney, Agent, or Firm*—Fitzpatrick, Cella, Harper & Scinto

[57] ABSTRACT

A liquid jet recording head is produced by (a) forming a solid layer comprising a photoresist of a positive type photosensitive material on a substrate in accordance with the pattern of the liquid flow path, (b) filling up the recess on the substrate where the solid layer is not present, with a liquid flow path wall forming material, and (c) removing the solid layer from the substrate.

28 Claims, 5 Drawing Sheets

PROCESS FOR PRODUCING A LIQUID JET RECORDING HEAD

This is a continuation of application Ser. No. 811,460 filed Dec. 20, 1985, now U.S. Pat. No. 4,657,631 issued Apr. 14, 1987.

BACKGROUND OF THE INVENTION

1. Field of the Invention

The present invention relates to a process for producing a liquid jet recording head for ejecting a recording liquid as a liquid droplet by using an ink jet recording system.

2. Description of the Prior Art

A liquid jet recording head applied to an ink jet recording system (a liquid jet recording system) usually has a fine liquid discharging port (hereinafter referred to as orifice), a liquid flow path and a liquid discharge energy generator arranged along the liquid flow path. Heretofore, such a liquid jet recording head has been manufactured, for example, by forming fine grooves on a glass plate, a metal plate or the like by cutting or etching, and joining the grooved plate to another appropriate plate to form the liquid flow paths.

However, in the liquid jet recording head manufactured by the above conventional method, roughness in the liquid flow path inner wall thus cut is too high or the liquid flow path has a strain due to a difference in etching rate. Accordingly, it is difficult to form a liquid path of a constant flow path resistance and the liquid discharge characteristics of the liquid jet recording head thus manufactured are not uniform.

During the cutting step, the plate may be easily cracked or broken. Thus manufacturing yield is low. When the etching processing is carried out, the number of the manufacturing steps increases and the manufacturing cost increases. Further, the above-mentioned conventional methods have the following common defects.

(1) An overlaying plate for a driving element such as a piezoelectric element, an electro-thermal transducer and the like generating discharge energy for discharging recording liquid droplet is difficult to accurately on a grooved plate in which the liquid flow path is formed.

(2) It is difficult to utilize when producing large quantities.

In the general cases, the liquid jet recording head is always in contact with the recording liquid when in use. The above recording liquid is generally an ink liquid mainly composed of water which is not neutral in many cases or an ink liquid mainly composed of an organic solvent. Therefore, it is desired to use a head-constituting material of the liquid jet recording head which does not cause a lowering of the strength by the influence of the recording liquid and to use a recording liquid in which a harmful ingredient causing deterioration of the recording liquid is not contained. However, in the conventional methods, a material answering the purpose could be not always selected due to the restriction of the processing method, etc.

Further, U.S. Pat. No. 4,412,224 discloses a process for producing a liquid jet recording head as described below. The following steps are successively carried out: (1) forming a resist pattern constituting the liquid flow path on the substrate using a negative type photoresist, (2) forming the side wall part of the liquid flow path on the portion, on which the above resist pattern is not provided, by electroplating, (3) removing the resist pattern from the substrate, and (4) providing the ceiling plate.

However, for removing the above resist pattern from the substrate (the step (3)), exfoliation of the pattern has been carried out only by swelling the resist pattern in a liquid since the resist pattern composed of the negative type photoresist is not dissolved in a liquid. In this case, there is a drawback that the above pattern adheres partly, as the remains, to the substrate and the liquid flow path wall to cause lowering of the size accuracy of the liquid path.

SUMMARY OF THE INVENTION

An object of the present invention is to provide a new process for producing a liquid jet recording head which is inexpensive, precise and highly reliable.

Another object of the present invention is to provide a new process for producing a liquid jet recording head in which the liquid flow path is finely processed exactly at high accuracy with a good yield.

A further object of the present invention is to provide a new process for producing a liquid jet recording head which is hardly mutually affected by the recording liquid and is excellent in mechanical strength and chemical resistance According to the present invention, there is provided a process for producing a liquid jet recording head comprising a liquid flow path, a liquid ejection port communicating with the liquid flow path, and a liquid ejection energy generating member arranged along the liquid flow path which comprises the steps:

(a) forming a solid layer comprising a photoresist of a positive type photosensitive material on a substrate in accordance with the pattern of the liquid flow path, (b) filling up the recess on the substrate where the solid layer is not present, with a liquid flow path wall forming material, and (c) removing the solid layer from the substrate.

BRIEF DESCRIPTION OF THE DRAWINGS

FIGS. 1–6 show schematically steps of embodiments of the present invention.

FIG. 1 is a schematical oblique view of a substrate provided with liquid ejection energy generating elements before forming a solid layer;

FIG. 3 is a schematic cross sectional view taken along the same position as in FIG. 2B after laminating a liquid flow path wall forming material;

FIG. 4 is a schematic cross sectional view cut at the same position as in FIG. 2B when a liquid curing material is used as a liquid flow path wall forming material and after curing the material;

FIG. 5 is a schematic cross sectional view cut at the same position as in FIG. 2B after removing a solid layer;

FIG. 6 is a schematic oblique view of a completed liquid jet recording head.

DESCRIPTION OF THE PREFERRED EMBODIMENTS

The present invention will be illustrated in reference to the accompanying drawings.

FIGS. 1-6 are a schematic process view for illustrating a fundamental embodiment of the present invention. An example of the constitution of the liquid jet recording head produced by the method of the present invention and the procedure for production thereof is shown in FIGS. 1-6. In the example, a liquid jet recording head having two orifices is shown. However, the liquid jet recording head of the present invention includes the high density multiorifice liquid jet recording head having more than two orifices and a liquid jet recording head having one orifice. Further, shown in this example is the process for producing the liquid jet recording head having the orifice for discharging a liquid toward the direction similar to that of the liquid flow. However, the present invention is not limited thereto and includes, for example, a process for producing a liquid jet recording head having an orifice for discharging a liquid toward the direction perpendicular to that of the liquid flow.

Figure 1:
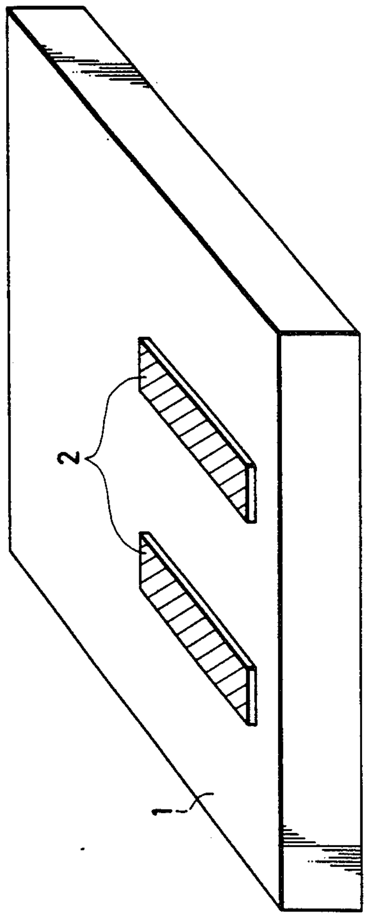

In this embodiment, a substrate 1 composed of, for example, a glass, ceramic or metal, etc. as shown in FIG. 1 is used. FIG. 1 is a schematic oblique view of a substrate before formation of a solid layer, on which a liquid discharge energy generator is provided.

Substrate 1 can be used without being limited in the shape, the quality of the material or the like in the case where substrate 1 acts as a part of the liquid flow path-constituting member or acts as a support for forming a solid layer and liquid flow path wall as described hereinafter. A desired number (two in FIG. 1) of liquid discharge energy generator 2 of an electro-thermal transducer or a piezoelectric element, etc. is arranged on the above substrate 1. Discharge energy for forming recording liquid droplets is supplied to the ink liquid by liquid discharge energy generator 2. Therefore, for example, in the case where the electro-thermal transducer is used as the above liquid discharge energy generator 2, the recording liquid on this generator and its vicinity is heated by the generator to supply discharge energy. In the case where the piezoelectric element is used as the generator 2, discharge energy is generated by the mechanical vibration of this element.

An electrode for inputting a controlled signal (not shown in the figure) is connected to the above generator 2, that is, the electro-thermal transducer and piezoelectric element for operating those. In general, a functional layer such as a protecting layer and the like is provided with the object of improving the durability of the discharge energy generator. In the present invention, of course, such a functional layer may be provided. In this embodiment, the discharge energy generator is provided on the substrate before formation of the liquid flow path. However, the generator may be also provided on the substrate at any time.

Figure 2A:
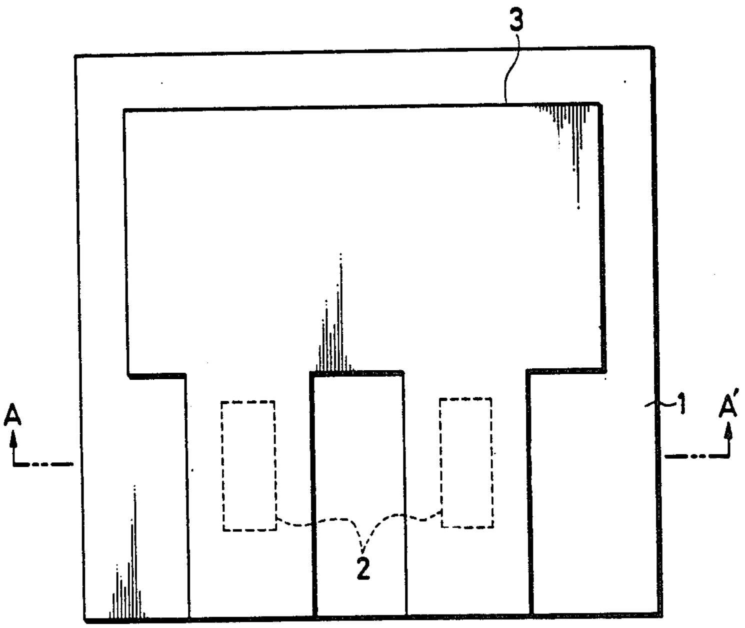
FIG. 2A is a schematic plan view after forming a solid layer.
Figure 2B:
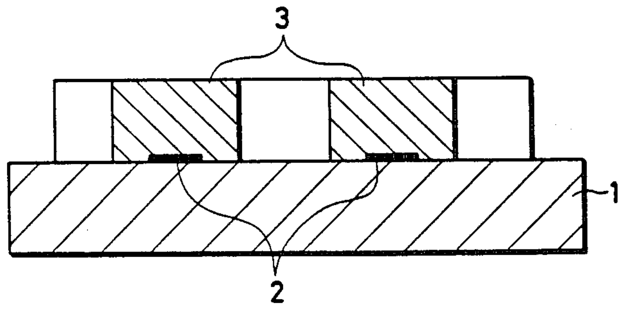
FIG. 2B is a schematic cross sectional view taken along the A—A' line of FIG. 2A.

Next, solid layer 3 is formed on the portion predetermined for forming the liquid flow path, on which the above liquid discharge energy generator 2 is previously provided, on the substrate as shown FIG. 2A and FIG. 2B. FIG. 2A is a schematic plane view after formation of the solid layer. FIG. 2B is a cross-sectional view taken along a dot and dash line A—A' in FIG. 2A.

The above solid layer 3 is removed from substrate 1, after a material for forming the liquid flow path wall is formed as described hereinafter, to form the liquid flow path. Of course, it is possible to form the liquid flow path in the desired shape. The above solid layer 3 provided for formation of the liquid flow path can be formed depending on the shape of the liquid flow path. In this embodiment, for discharging recording droplets from each of two orifices corresponding to two discharge energy generators, the portion formed by removing the solid layer comprises two fine liquid flow paths and a common liquid chamber for supplying a recording liquid to the above two paths.

According to the present invention, the material constituting the solid layer is a positive type photosensitive material. A positive type photosensitive material has various advantages such as (i) the resolution is better than that of a negative type photosensitive material, (ii) the relief pattern has a vertical and smooth side wall surface, (iii) the relief pattern can be dissolved and removed by using a developing liquid or an organic solvent, and the like. Therefore, a positive type photosensitive material is a desirable material for forming the solid layer. The positive type photosensitive material may be either in a form of liquid or a dry film. The positive type photosensitive material in a form of a dry film is the most preferably material since a thick film of, for example, 10–100 μm can be produced and the film thickness can be easily controlled and the uniformity and handling property are excellent.

As the positive type photosensitive material, there may be used, for example, materials comprising o-naphthoquinone diazides and alkali soluble phenolic resins, and materials comprising alkali soluble resins and substances capable of finally forming phenol by photolysis such as diazonium salts, for example, benzene diazonium salts. Among them, as the positive type photosensitive dry film, there may be used, for example, a film member composed of a polyester sheet and the above-mentioned positive type photosensitive material overlying the polyester sheet such as "OZATEC R 225" (tradename, manufactured by Hoechst Japan Co.).

The solid layer can be formed with a positive type photosensitive material according to an image forming process using a positive type photosensitive material.

According to the present invention, the solid layer may be produced such that a solvent-soluble polymer layer and a positive type photoresist layer of desired thicknesses are successively laminated on a substrate 1, and a pattern is formed in the positive type photoresist layer followed by selectively removing the solvent-soluble polymer layer.

As the solvent soluble polymer, there may be used any high polymer compounds capable of forming a film by coating if there is a solvent which can dissolve the polymer.

As the positive type photoresist, there may be used typically a positive type liquid photoresist comprising a novolac type phenolic resin and a naphthoquinone diazide, and the like.

It is optimum to use a positive type photosensitive dry film from the standpoints of processing accuracy, easy removal and processability.

Figure 3:
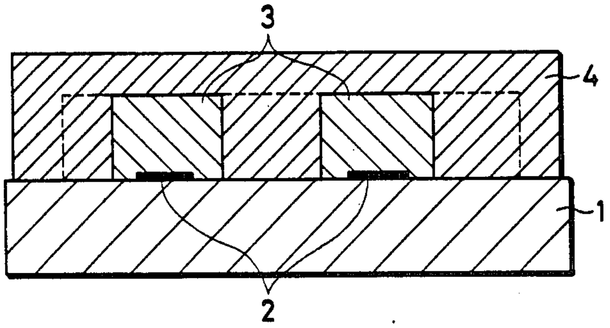

The substrate 1 having a solid layer 3 thereon is covered, for example, with a liquid flow path wall forming material 4 as shown in FIG. 3. FIG. 3 is a schematical cross section at the position similar to that of FIG. 2B after the liquid flow path wall forming material 4 has been overlaid.

As the liquid flow path wall forming material, there may be used preferably any material which can cover the above-mentioned solid material.

Since the material is to be a construction material constituting a liquid jet recording head by forming liquid flow paths, it is preferable to select a material excellent in adhesion to a substrate, mechanical strength, dimensional stability and corrosion resistance.

As such materials, there are used preferably liquid materials capable of being cured by heat, ultraviolet ray or electron beam. In particular, there are preferably used epoxy resins, acrylic resins, diglycol dialkyl carbonate resins, unsaturated polyester resins, polyurethane resins, polyimide resins, melamine resins, phenolic resins, urea resins and the like. In addition, there may be used metals capable of being laminated by electrolytic plating, vapor deposition, sputtering, or the like, for example, Cu, Ag, Au, Ni, Cr, Sn, Pb, Zn, Al, Ti and the like. According to vapor deposition or sputtering, there may be used compounds such as metal oxides, sulfides and the like.

According to the present invention, it is preferable to use the above-mentioned liquid curing material as the liquid flow path wall forming material from the standpoint of process efficiency.

When the above-mentioned liquid curing material is used as the liquid flow path wall forming material, the material is coated in a desired thickness on a substrate by means of a known technique such as curtain coating, roll coating, spray coating and the like. It is preferable to effect coating after deaerating the material while avoiding entrainment of air-bubbles.

When, for example, a liquid flow path wall forming material 4 overlays as in FIG. 3 and the material is composed of the above-mentioned curing material, the curing material is cured under a predetermined condition in such a state that flowing-out and flowing of the liquid are suppressed and if desired, a pressing plate is placed at the upper portion.

Figure 4:
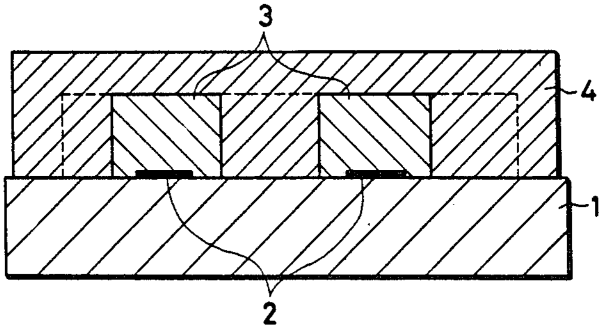

FIG. 4 is a schematic cross sectional view where a liquid curing material is used as the liquid flow path wall forming material and the position of the cross section is similar to that of FIG. 2B.

Where the curing condition is a room temperature or heating curing, the material is allowed to stand for 30 min. to 2 hours. Where the curing is an ultraviolet ray curing or the like, the irradiation for 10 min. or less can cure the material.

According to the present invention, the most useful method upon laminating the liquid flow path wall forming material 4 is a curing method comprising curing epoxy resins with a compound capable of releasing a Lewis acid by an active ray such as aromatic diazonium salts, aromatic onium salts and the like.

After curing, the solid layer 3 is removed from the substrate provided with solid layer 3 and liquid flow path wall forming material 4 to form liquid flow paths.

Though the means for removing solid layer 3 is not critical, it is preferable, for example, to soak the substrate in a liquid capable of dissolving the solid layer 3 thereby to remove the solid layer 3. Upon removing the solid layer, if desired, various means for accelerating the removal such as ultrasonic treatment, spray, heating, agitation and the like may be used.

As the liquid used for the above-mentioned removing means, there can be used, for example, halogen-containing hydrocarbons, ketones, esters, aromatic hydrocarbons, ether, alcohols, N-methylpyrrolidone, dimethylformamide, phenols, water, aqueous solution of strong alkali and the like. If necessary, surfactants may be added to the above-mentioned liquid. It is preferable to irradiate the solid layer further with a light such as ultraviolet ray and the like. It is also preferable to heat the liquid to 40°–60° C.

Figure 5:
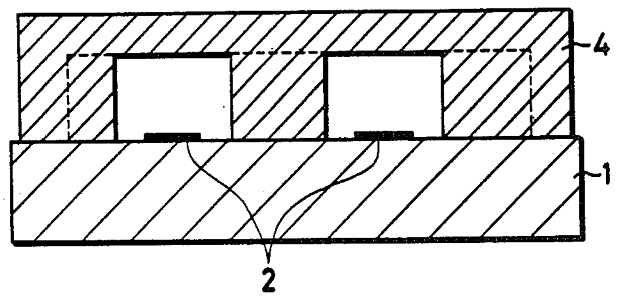
Figure 6:
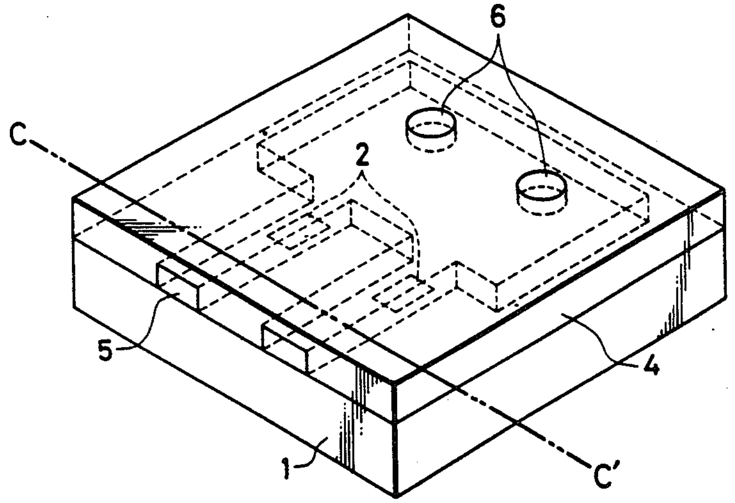

FIG. 6 shows an embodiment where the solid layer 3 is removed by dissolution. Liquid supplying ports 6 are formed before the solid layer is removed by dissolution, and then the solid layer is removed. FIG. 6 is a schematic oblique view of the liquid jet recording head after the removal of the solid layer. FIG. 5 is a schematic cross sectional view at the position similar to that of FIG. 2B after the removal of the solid layer 3.

In the embodiment as above, the solid layer 3 is soaked in a liquid capable of dissolving the solid, and is dissolved and removed through liquid supplying ports 6. When the orifice tips are not exposed, the assembly of the substrate, solid layer and liquid flow path wall forming material is cut along the dot and dash line C—C′ in FIG. 6 before removing by dissolution so as to expose the orifice tips.

However, such cutting of the orifice tips of the substrate assembly is not always necessary. For example, when a liquid curing material is used as a liquid flow path wall forming material, a mold is used for laminating materials, the tip portions of orifices are not covered, and the tip portions of orifices are shaped flat, the cutting is not necessary.

As mentioned above, there are fabricated a liquid jet recording head in which desired liquid flow paths 5 are formed at desired positions of the substrate 1 provided with ejection energy generating elements 2. If desired, after forming the liquid flow paths, cutting is effected along the line C—C′ in FIG. 6. This cutting is effected so as to optimize the distance between the liquid ejection energy generating element 2 and the orifice, and the region to be cut may be optionally determined. If desired, the orifice tips are polished and smoothed to optimize the liquid ejection.

Figure 7:
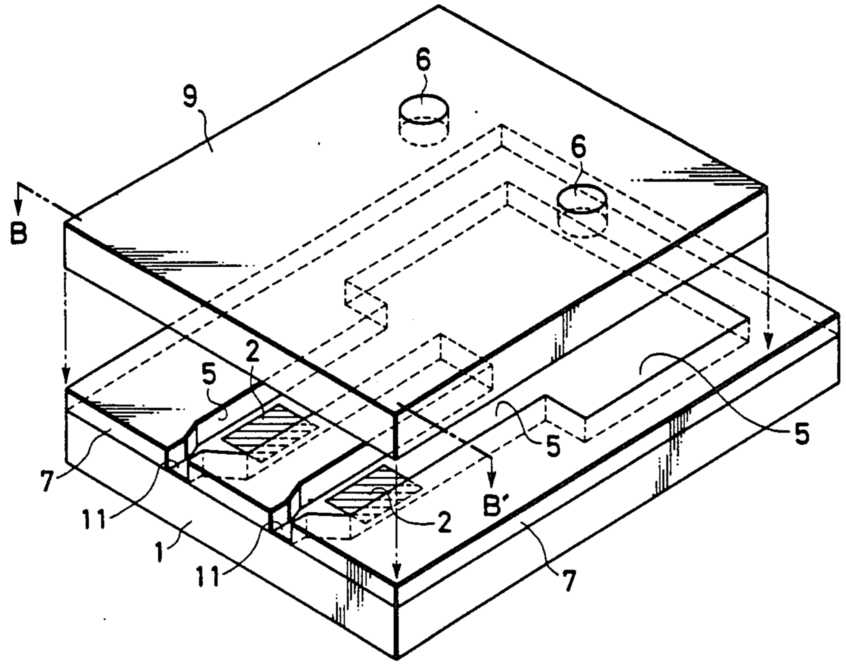
FIG. 7 is a schematic oblique view of another embodiment of the liquid jet recording head according to the present invention before adhering a ceiling plate.

Further, for example, as shown in FIG. 7, after the formation of the solid layer, a liquid flow path wall forming material of a desired thickness is laminated to the solid layer and then the solid layer is removed according to the above-mentioned procedures to form only the liquid path walls 7 with the liquid flow path wall forming material. Then a desired ceiling plate 9 is adhered to the liquid flow path wall forming material to fabricate a liquid jet recording head.

FIG. 7 is a schematic oblique view of a liquid jet recording head before adhering the ceiling plate. If desired, the head is cut along the line B—B′.

In the present embodiment, when the flow path wall 7 and the solid layer have the same height, the solid layer may be removed after or before the ceiling plate 9 is adhered. By adhering the ceiling plate 9 after removing the solid layer, the removal of the solid layer can be made more surely and it is possible to improve the production yield and productivity.

In the liquid flow path construction member of the present invention, flow path wall 7 and ceiling plate 9 may be separated as shown in FIG. 7, or they may be integrated as shown in FIG. 6.

It is preferable to form integrally the flow path wall 7 and the ceiling plate 9 since the fabricating steps are simple. In this case, it is not particularly necessary to use an adhesive and therefore, there are not caused the disadvantages that an adhesive flows in the grooves to clog the grooves and adheres to the liquid ejection energy generating elements to lower the function. Further, preferable dimension accuracy can be obtained.

Hereinafter, the present invention is described more in detail referring to the following examples.

EXAMPLE 1

Liquid jet recording heads having the structure shown in FIG. 6 were produced following the producing procedure shown in FIGS. 1 to 6.

At first, on a glass substrate provided with electrothermal transducers (material:$H_fB_2$) as liquidejecting-energy generating members, a photosensitive layer of 50 μm thick made of positive type dry film "OZATEC R225" (supplied by Hoechst Japan K.K.) was formed by lamination. A photomask having a pattern corresponding to FIG. 6 was placed on the photosensitive layer, and the portion other than where liquid flow paths were to be formed was irradiated with UV-ray of 70 mJ/cm$^2$. The lengths of the liquid flow paths were 3 mm. Then, spray development was effected with 1% caustic soda solution to form a relief solid layer of about 50 μm thick on the aforesaid portion of the glass substrate including electrothermal transducers where liquid flow paths were to be formed.

Following the same procedure as described above, three substrates in total on which a solid layer was formed in the same manner as above were produced, and then the recessed portion of each substrate where the aforesaid solid layer was not formed was filled with a liquid material having a curing property shown in Table 1. This treatment was effected as follows.

The respective curing materials (a), (b) and (c), mixed with a catalyst (1 wt % of methyl ethyl ketone peroxide was added in case of using (b) or (c)) or a hardner if necessary, were degassed by the use of a vacuum pump. The thus degassed curing materials of three kinds were then applied in the thickness of 100 μm respectively to the aforesaid substrates on which the solid layer was formed by the use of an applicator. These substrates of three kinds were allowed to stand for 12 hours at 30° C. to render the respective liquid curing materials on the substrates to completely cure.

After curing, the respective three substrates were then irradiated with UV-ray of a quantity of 3000 mJ/cm$^2$ to solubilize the solid layer of positive type dry film. After solubilizing treatment, the respective three substrates were cut at the position where orifices were to be formed, and an end surface was formed to be exposed.

The substrates of three kinds where the end surface was exposed were immersed respectively in an aqueous 5% NaOH solution, and dissolution removing treatment was effected for about 10 minutes in an ultrasonic cleaning vessel. After this treatment, the respective substrates were rinsed with pure water for 5 minutes and dried.

TABLE 1

| | Resin | Trade Name | Supplier |
|---|---|---|---|
| (a) | epoxy resin | Araldite CY230/HY956 | Ciba-Geigy A.G. |
| (b) | unsaturated polyester resin | Polylite CH304 | Dainihon Ink K.K. |
| (c) | acrylic resin | Acrysirup SY-105 | Mitsubishi Rayon Co. |

No residue of solid layer was found in any liquid flow path of the three liquid jet recording heads thus produced. Furthermore, these respective liquid jet recording heads were mounted on a recording apparatus, and recordings were performed respectively by using an ink-jet ink composed of pure water/glycerin/Direct Black 154 (water-soluble black dye)=65/30/5 to obtain a stable printing.

EXAMPLE 2

A liquid jet recording head having the structure of FIG. 6 was produced by using Ni and Cr as a material for forming the liquid flow path walls.

At first, a photosensitive layer of 25 μm thick made of positive type dry film "OZATEC R225" (by Hoechst Japan K.K.) was formed on a glass substrate provided with electrothermal transducers (material: $H_fB_2$) as liquid-ejecting-energy generating members. Then, a glass photomask corresponding to FIG. 6 was placed thereon, and the portion other than where liquid flow paths were to be formed was irradiated with UV-ray of 40 mJ/cm$^2$. Subsequently, spray development was effected by using 1% aqueous caustic soda solution to form a solid layer of about 25 μm thick on the aforesaid portion of glass substrate including the electro-thermal transducers where liquid flow paths were to be formed. The orifice portions thus formed were 2 mm in length, 20 μm in width and 30 μm in interval.

The substrate on which solid layers were formed was placed in a sputtering device of magnetron type, and a thin layer of metallic Cr having a thickness of 0.1 μm was formed on the surface of substrate where solid layers were formed. Then, the substrate was immersed in an electrolytic plating bath at pH 4.5 primarily containing nickel chloride and nickel sulfate, and plating was effected at 50° C. for 60 minutes to form a nickel layer of approximately 80 μm thick.

After lamination of Ni and Cr as the material for forming liquid flow path walls was completed, inlets for supplying liquid were perforated, and the end of orifice was exposed by cutting the substrate. Subsequently, the substrate was immersed in a mixed liquid composed of ethanol/dodecyl-benzenesulfonic acid (95:5 by weight part ratio), and a dissolution removing treatment was effected for approximately 10 minutes in an ultrasonic cleaning vessel. After this treatment, the substrate was rinsed with pure water for 5 minutes and dried.

The liquid jet recording head thus produced was mounted on a recording apparatus, and a recording test for three months was performed. As a result, generation of precipitates in inks or ejection instability by clogging did not occur, and good printing was possible. In addition, no peeling-off, distortion of orifices or the like was observed.

EXAMPLE 3

A liquid jet recording head having the structure of FIG. 6 was produced following the procedure of FIGS. 1 to 6.

At first, on a glass substrate provided with electrothermal transducers (material:$H_fB_2$) as liquid-ejecting-energy generating members, there was formed a photosensitive layer made of a dry film obtained by coating a Lumirror Q-80 (trade name, by Toray) film with cresol-Novolac type phenolic resin: 30 parts, esterified product of naphthoquinone-(1,2)-diazide-(2)-5-sulfonic acid and 2,3,4-trihydroxybenzophenone: 25 parts, polyethyl acrylate (weight average molecular weight: 8000):15 parts, and polyvinyl methyl ether (Lutonal A-25; trade name, supplied by BASF) solution in ethylene glycol monomethyl ether: 30 parts in the film thickness after dried of 50 μm by lamination. A photomask having a pattern corresponding to FIG. 6 was placed on the photosensitive layer, and the portion other than where liquid flow paths were to be formed was irradiated with UV-way of 70 mJ/cm$^2$. The lengths of the liquid flow paths were 3 mm. Then, spray development was effected with 1% caustic soda solution to form a relief solid layer of about 50 μm thick on the aforesaid portion of glass substrate including electrothermal transducers where liquid flow paths were to be formed. On the substrate where the solid layer was formed, a liquid material having a curing property was laminated. This treatment was effected as follows.

A curing material consisting of triphenylsulfonium hexafluoroborate (having the following structure): 5 parts,

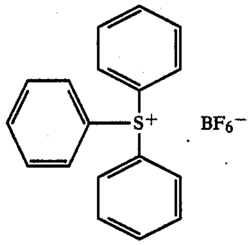

epoxy resin UVR-6100 (by Union Carbide): 50 parts, epoxy resin UVR-6351 (by Union Carbide): 45 parts was applied in the thickness of 100 microns to the substrate on which the aforesaid solid layer was formed. The substrate was irradiated with UV-ray having an intensity of 40 mW/cm$^2$ at a wave length of 365 nm for 60 seconds to render the liquid curing material on the substrate to completely cure.

After curing, the substrate was then irradiated with UV-ray of a quantity of 3000 mJ/cm$^2$ to solubilize the solid layer of positive type dry film. After solubilizing treatment, the substrate was cut at the position where orifices were to be formed, and an end surface was formed to be exposed.

The substrate where the end surface was exposed was immersed in an aqueous 5% NaOH solution, and dissolution removing treatment was effected for about 10 minutes in an ultrasonic cleaning vessel. After this treatment, the substrate was rinsed with pure water for 5 minutes and dried.

No residue of solid layer was found in any liquid flow path of the liquid jet recording head thus produced. Furthermore, the liquid jet recording head was mounted on a recording apparatus, and recording were performed by using an ink-jet ink composed of pure water/glycerin/Direct Black 154 (water-soluble black dye)=65/30/5 to obtain a stable printing.

As described above, there are obtained such advantages by the present invention as enumerated below.

(1) Since the main process steps in the production of a head rely on a so-called printing technique, that is, a microprocessing technique using photoresists, photosensitive dry films or the like, precise and delicate portions of a head can be formed very easily to a desired pattern, and many heads having the same structure can be processed simultaneously.

(2) Since materials not interfering with a recording liquid consisting of a non-neutral aqueous solution or containing organic solvents as the medium thereof and moreover excelling in an adhesion property and a mechanical strength are used as the head constituting material, durability and reliability of a recording apparatus can be enhanced.

(3) The relatively few manufacturing steps result in a high productivity.

(4) Since such processings or treatments of the head tip as cutting, grinding and the like are not necessarily required, enhanced yield or lowered cost may be established.

(5) Since alignment of the principal structural portions can be performed readily and accurately, a head having high dimensional precision can be obtained with high yield.

(6) Multi-array heads of high density can be manufactured by a simple method.

(7) The thicknesses of groove walls forming liquid flow paths can be controlled readily, and thus liquid flow paths having desired dimensions (for example, the depth of groove) are obtained depending on the thickness of solid layer.

(8) Continuous mass-production is possible.

(9) Since etching solutions (strong acids such as hydrofluoric acid and the like) are not necessarily used, this process excels in safety and sanitation.

What is claimed is:

1. A process for producing a liquid jet head, the process comprising the steps of:

forming a layer including a photosensitive material on a substrate and irradiating the layer with light in a pattern;

removing the portion of the layer irradiated with light;

filling the removed portion with a liquid flow path wall forming material; and removing the remaining portion of the layer.

2. The process according to the claim 1 in which the photosensitive material is a positive type.

3. The process according to claim 2 in which the positive type photosensitive material is a dry film.

4. The process according to claim 1 in which the liquid flow path wall forming material is a liquid curing material.

5. The process according to claim 4 in which the liquid curing material is curable by heat.

6. The process according to claim 4 in which the liquid curing material is curable by ultraviolet radiation.

7. The process according to claim 4 in which the liquid curing material is curable by an electron beam.

8. The process according to claim 4 in which the liquid curing material is at least one of the materials selected from the group of epoxy resins, acrylic resins, diglycol dialkyl carbonate resins, unsaturated polyester resins, polyurethane resins, polyimide resins, melamine resins, phenolic resins and urea resins.

9. The process according to claim 1 in which the liquid flow path wall forming material is a metal or metal compound.

10. The process according to claim 9 in which the metal is at least one of the metals selected from the group of Cu, Ag, Au, Ni, Cr, Sn, Pb, Zn, Al and Ti.

11. The process according to claim 1, further comprising the step of irradiating the remaining portion of the layer with light in advance of the last-recited removing step.

12. The process according to claim 11 in which the light is ultraviolet.

13. The process according to claim 1 in which the substrate is composed of glass.

14. The process according to claim 1 in which the substrate is composed of a ceramic.

15. The process according to claim 1 in which the substrate is composed of metal.

16. The process according to claim 1 in which a liquid ejection energy generating member is provided on the substrate.

17. The process according to claim 16 in which the liquid ejection energy generating member includes an electro-thermal transducer.

18. The process according to claim 16 in which the liquid ejection energy generating member includes a piezoelectric element.

19. The process according to claim 1 further comprising the step of forming a liquid ejection energy generating member on the substrate prior to said forming step.

20. The process according to claim 1 in which the photosensitive material is a liquid.

21. The process according to claim 1 in which the photosensitive material is a material comprising an o-naphthoquinone diazide and an alkali soluble phenolic resin.

22. The process according to claim 1 in which the photosensitive material is a material comprising an alkali soluble resin and a substance capable of finally forming phenol by photolysis of a diazonium salt.

23. The process according to claim 1 in which the light is ultraviolet.

24. The process according to claim 1 in which the step of removing the remaining portion of the layer is carried out by soaking the remaining portion in a liquid capable of dissolving the remaining portion.

25. The process according to claim 24 in which the liquid is at least one of the liquids selected from the group comprising halogen-containing hydrocarbons, ketones, esters, aromatic hydrocarbons, ethers, alcohols, N-methylpyrrolidone, dimethylformamide, phenols, water and an aqueous solution of a strong alkali.

26. The process according to claim 24, further comprising the step of ultrasonic treatment.

27. The process according to claim 24 in which the remaining portion is subjected to heating.

28. The process according to claim 24 in which the liquid is subjected to agitation

* * * * *

UNITED STATES PATENT AND TRADEMARK OFFICE

CERTIFICATE OF CORRECTION

PATENT NO. : 4,775,445

DATED : October 4, 1988

INVENTOR(S) : HIROMICHI NOGUCHI

It is certified that error appears in the above-identified patent and that said Letters Patent is hereby corrected as shown below:

COLUMN 1

Line 45, "accurately" should read --set accurately--.

COLUMN 7

Line 12, "liquidejecting-" should read --liquid-ejecting- --.
Line 35, "hardner" should read --hardener--.

COLUMN 9

Line 9, "UV-way" should read --UV-ray--.
Line 57, "were" should read --was--.

COLUMN 10

Line 42, "the" (first occurrence) should be deleted.

Signed and Sealed this

Eighteenth Day of April, 1989

*Attest:*

DONALD J. QUIGG

*Attesting Officer*

*Commissioner of Patents and Trademarks*